May 22, 1923.
W. M. WHEILDON
DELIVERING MATERIAL FROM ROLLS
Filed Aug. 6, 1920
1,456,291
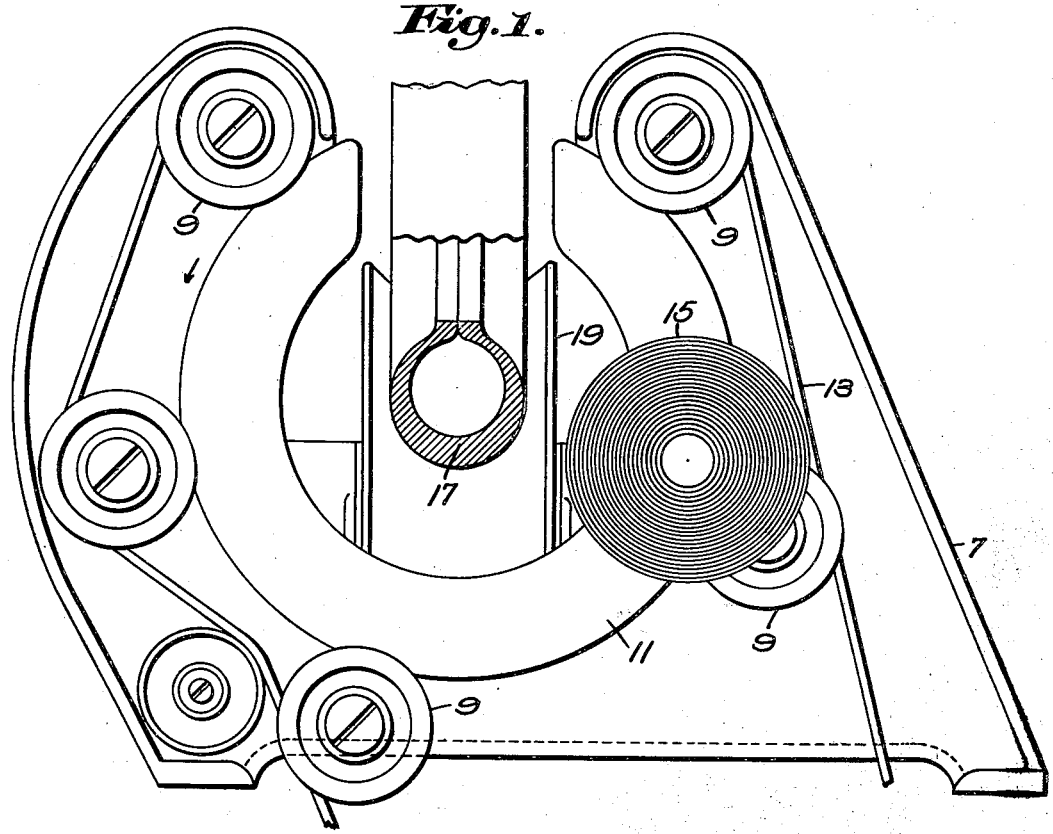
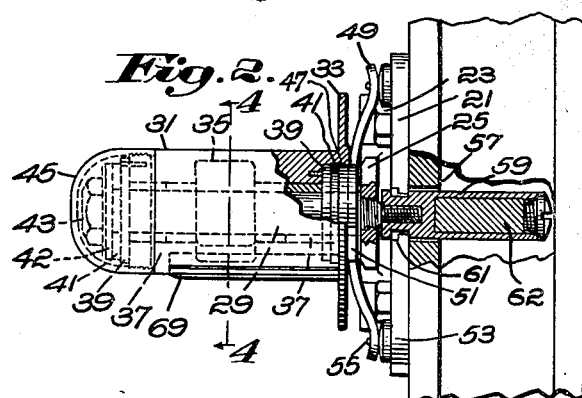
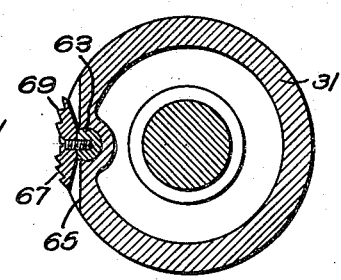
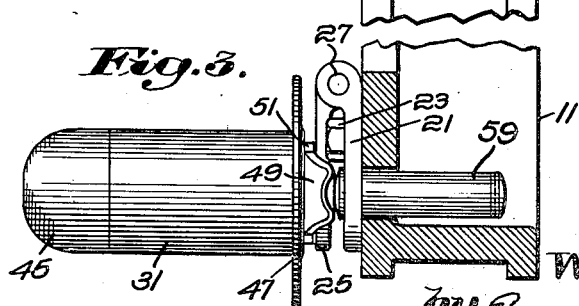
Inventor:
William M. Wheildon
by Emery, Booth, Janney & Varney
Attys.

Patented May 22, 1923.

1,456,291

UNITED STATES PATENT OFFICE.

WILLIAM M. WHEILDON, OF ASHLAND, MASSACHUSETTS, ASSIGNOR TO EDWARD H. ANGIER, OF FRAMINGHAM, MASSACHUSETTS.

DELIVERING MATERIAL FROM ROLLS.

Application filed August 6, 1920. Serial No. 401,742.

*To all whom it may concern:*

Be it known that I, WILLIAM M. WHEILDON, a citizen of the United States, and a resident of Ashland, county of Middlesex, and State of Massachusetts, have invented an Improvement in Delivering Material from Rolls, of which the following description, in connection with the accompanying drawings, is a specification, like characters on the drawings representing like parts.

This invention relates to mechanisms for controlling the feed of material from rolls and in particular to a means governing the tension under which the material unwinds. Certain features of the invention in the form herein disclosed adapt it more particularly for use with machines of the type having a revolving head or shuttle on which the roll is carried, so that the roll revolves bodily as well as rotates. An example of machines of this type is a machine designed for use in wrapping tires with a relatively narrow strip of paper and for convenience I have here shown and will describe the invention in connection with such a tire wrapping machine.

My invention will best be understood by reference to the following description of the illustrative embodiment thereof taken in connection with the accompanying drawings, wherein:

Figure 1 is a front elevation of a portion of the tire wrapping machine embodying the improvements which form the subject matter of my invention;

Fig. 2 is a side elevation partially broken away of a portion of the shuttle and the roll carrying mechanism;

Fig. 3 is a view taken at right angles to Fig. 1, the shuttle being shown in section; and Fig. 4 is a section on an enlarged scale on the line 4—4 of Fig. 2.

Referring to Fig. 1 of the drawings, I have there shown a portion of a wrapping machine such as may be used to form the package shown in Patent No. 1,282,167, dated October 22, 1918, to Edward H. Angier. Supported on a suitable frame 7 by rollers 9 is a nearly annular shuttle or head 11. This shuttle is engaged exteriorly by a bight of a driving belt 13 and is revolved about its own axis, carrying with it the roll 15 of wrapping strip. A tire 17 is supported by rolls 19 (only one of which is shown in Fig. 1) so that a portion passes through the eye or opening of the shuttle 11 and it is advanced by the rolls 19. Paper from the strip 15 is drawn off by the rotation of the shuttle and wrapped around the cross section of the tire and the feeding movement of the tire causes the strip to be applied as a helical wrapping.

When making the package described in the patent referred to, it is desirable to apply the wrapping strip under considerable tension to partially expand the resilient gatherings of the wrapping material and form a wrapping tightly drawn about the tire or other article. It will be apparent from inspection of Fig. 1, however, that when the roll of material is large, a much greater torque is exerted than when it is small and consequently a resistance to unwinding of the roll which would adequately tension the material when the roll is new may be unduly large after a considerable amount of the strip has been unwound. The present invention contemplates the provision of suitable means for automatically varying the tension to compensate for the reduction in turning moment as the material is unwound.

In accordance with the present invention I provide for this variable tension by utilizing as a governing force the centrifugal force due to the weight of the roll which, of course, varies as more or less of the material is consumed. I also provide for a structure wherein the roll support is unobstructed so that a roll may be placed thereon by a simple movement of approach toward the shuttle.

Referring more particularly to Figs. 2 and 3, the roll carrying mechanism or tensioning means, which takes the form of an adjustable brake restraining the unwinding movement of the strip, is here organized as a unit carried on a base plate 21 which may be secured to shuttle 11 by the screws 23. In the present embodiment of the invention this plate 21 forms one leaf of a hinge, the other leaf 25 being connected thereto by a pintle 27 which is located at the side nearer the center of the shuttle. From the plate 25 projects the spindle 29 on which rotates a roll-receiving hub 31 preferably provided with an inner flange 33 to receive and support the roll. This hub is preferably provided with a suitable means, one form of which is here shown and will hereafter be described, for automatically gripping the core of the roll of strip which is placed thereon, to which core the end of the strip itself is fastened, so that roll and hub will revolve as a unit. Thus, the rotation of the roll may be controlled through a braking force applied to the hub.

The hub 31 is preferably made of aluminum and constructed to be as light as possible so that the variations in the weight of the roll due to the consumption thereof in use will be substantial variations relative to the entire weight of the rotating parts. To assist in lightening the same, the hub may be cored out at 35 and this also provides an oil reservoir. The hub preferably revolves on bushings 37 of oil impregnated wood and has at either end steel washers 39 secured to the hub to rotate therewith and washers 41 of oil impregnated wood. The hub is secured to the spindle by a washer 42 and the terminal nut 43 which may be covered by the rounded cap 45 screwing on a reduced end of the hub and merging into the outer surface thereof as shown in Fig. 2.

To control the rotation of the hub a suitable brake shoe 47 is provided bearing on the inner washer 41 and adapted to exert an endwise braking pressure on the hub when pressed by the leaf spring 49, the middle of which is received between the ribs 51 of the brake shoe 47 (see Fig. 3) and the outer ends of which find a bearing against the shuttle 11. Herein I have shown the base plate 21 provided with rounded bosses 53 having pins 55 received in transverse slots in the ends of the spring. The rounding of the bosses 51 permits a rocking movement of the spring thereon as the hinge leaf 25 turns about its pintle, as will be clearly understood from Fig. 3.

The use of the washers 41 of oil impregnated wood between the bearing surfaces on the ends of the hub provided by the washers 39 and the bearing surfaces provided by the washer 42 and the brake shoe 47 gives a double braking surface. In practice, for example, the rotation may take place between the inner washer 41 and the brake shoe 47 until the bearing becomes heated. It will then stick and the rotation will then take place between the washer 41 and the washer 39 and so on in alternation.

It will be understood that when a roll is in position and the shuttle rotating at a rapid rate, the roll of material on the hub 31 will be thrown outwardly, that is, downwardly viewing Fig. 3, and will tend to tilt the spindle, swinging the hinge leaf 25 inwardly. The spindle being attached to this leaf will be drawn inwardly and through the nut 43 will draw the hub 31 inwardly and compress the spring 49 between the inner end of the hub and the shuttle, thus increasing the endwise braking force on the hub. A variable braking force is thus provided for which diminishes directly as the amount of material on the roll diminishes.

To limit the movement of the leaf 25 and also in the present instance to provide for an adjustment of the minimum tension, the latter may be connected to the base plate or to the rotating shuttle or head 11 by a lost motion connection limiting its outward movement but permitting it to move inwardly under the influence of the weight of the roll when acted on by centrifugal force. Herein the spindle 29 is threaded into the base plate 25 and is provided with a threaded extension 57 on which is screwed a nut 59 having a reduced waist portion 61 fitting an opening in the base plate, the length of this waist portion 61 being greater than the thickness of the margin of the opening, as clearly shown in Fig. 2. In Fig. 2 the leaf 25 is shown at the limit of its outward movement corresponding to the minimum tension on the brake spring 49 and obviously this tension may be varied by setting up the nut 59 which conveniently projects through the shuttle, as shown, and is provided with a slot to receive a screw driver. The length of the waist portion 61 permits the leaf 25 to swing inwardly under the influence of the heavy roll to provide an increased braking tension when the roll is large and heavy and the unwinding torque consequently greater.

In the present instance I have shown the nut 59 as considerably extended and as being weighted with lead 62, thus providing a counterweight for the hub 31 and for the spindle neutralizing more or less the effect of centrifugal force on the same. The effective force governing the braking action of the mechanism is thus the roll of wrapping material itself.

One suitable manner by which the roll of material may be clutched to the hub 31 may best be understood from Fig. 4. A hole 63 is drilled from the inner end of the hub which is then slabbed off on one side along the chord 65 providing an under-cut recess to receive a rod 67. Attached to the rod 67 is a plate 69, preferably provided with gripping teeth. The outer surface of this plate when in an intermediate position is roughly concentric with the hub 31 and it is capable of a limited rocking movement in either direction until it bears on the flattened surface 65. It will be understood that if a core is placed around the hub 31 and the material is drawn therefrom in such a way as to tend to rotate the core, the plate 69 will be rocked in one direction or the other and the other end thereof will be thrown out into gripping engagement with the core of the roll, thus clutching it to the hub so that the two rotate in unison. As seen in Fig. 2, the outer end of the member 69 is preferably tapered away so that if a roll is placed in position over the outer end of the spindle it may be easily pushed home thereon against the flange 33 without interference from the clutch plate 69.

Having thus described in detail the particular embodiment of my invention shown by way of example in the accompanying drawings, the principles exemplified thereby which I claim as new and desire to secure by Letters Patent I shall express in the following claims.

Claims:

1. A machine of the class described comprising a rotating head, a rotary support for a roll of material thereon and means also carried by the head responsive to the centrifugal force due to the weight of such material to apply a braking force resisting rotation of such support.

2. A machine of the class described comprising a rotating head, a rotary support for a roll of material thereon and free to move in response to centrifugal force and a brake surface on the head against which the support is pressed under the influence of such force.

3. A machine of the class described comprising a rotating head, a rotary support for a roll of material thereon and free to move in response to centrifugal force and a brake spring on the head against which the support is pressed under the influence of such force.

4. A machine of the class described comprising a rotating head, a spindle hinged thereto to swing under the action of centrifugal force, a roll-receiving hub carried by the spindle and a spring interposed between hub and head and arranged to resist hinging movement of the spindle.

5. A tension device comprising a hinge leaf for attachment to a rotating head, a spindle projecting therefrom, a roll-receiving hub on the spindle and a spring brake at the inner end of the spindle disposed laterally of the pivot of said leaf and adapted to find a bearing on the head.

6. A device as defined in claim 5 wherein head-engaging means are provided for initially drawing said leaf against the spring.

7. A device as defined in claim 5 wherein means are provided limiting outward swinging of said leaf while permitting inward movement against the brake.

8. A machine of the class described comprising a rotating head, a plate hinged thereto and having a lost motion connection therewith remote from the hinge, a roll-receiving hub rotatably mounted on the plate and yieldable brake means interposed between hub and head.

9. A machine of the class described having a head rotating in a vertical plane, a roll-receiving support projecting from a face thereof and means carried by the head and organized at the inner end of the support whereby to leave the roll-receiving portion unobstructed, said means being adapted to apply to the support during the rotation of the head a braking force automatically varying to provide a substantially constant tension as the roll is expended.

10. A machine of the class described having a head rotating in a vertical plane, a roll-receiving support projecting from a face thereof and means carried by the head and located at the inner end of the support and governed during rotation of the head by the weight of the roll to apply a variable braking force to the support.

11. A machine of the class described comprising a rotating head, a hinge leaf thereon, a roll receiving hub carried thereby, a spring interposed between the hub and the head and means for providing an initial tension comprising an adjustable connection between the leaf and head and permitting motion of the former against the spring.

12. A machine of the class described comprising a rotating head, a rotary support for a roll of material thereon and free to move in response to centrifugal force, a brake spring against which the support is pressed under the influence of such force and means for adjustably positioning the support against the spring to provide an initial tension.

13. A machine of the class described comprising a rotating head, a plate hinged thereto and having remote from the hinge a lost motion connection therewith limited in two directions, a roll receiving hub rotatably mounted on the plate and yieldable brake means interposed between hub and head.

14. A machine of the class described comprising a rotating head, a spindle hinged thereto, a roll receiving hub carried by the spindle, a spring interposed between hub and head and a counterweight to balance the hub under centrifugal force.

15. A tension device comprising a hinge leaf for attachment to a rotating head, a spindle projecting therefrom, a roll-receiving hub on the spindle, a spring brake at the inner end of the spindle adapted to find a bearing on the hub and a member projecting in the opposite direction from the spindle having provision for coupling the leaf to the head with provision for lost motion and constituting a counterweight for the hub.

16. A tension device comprising a hinge leaf for attachment to a rotating head, a spindle projecting therefrom, a roll-receiving hub on the spindle, a spring brake at the inner end of the spindle adapted to find a bearing on the hub, a threaded member projecting in the opposite direction from the spindle and a weighted nut cooperating therewith adapted to engage the head.

In testimony whereof, I have signed my name to this specification.

WILLIAM M. WHEILDON.